(12) United States Patent
Nemeth (10) Patent No.: US 11,373,070 B1
(45) Date of Patent: Jun. 28, 2022

(54) PRINT JOB ANALYSIS AND SECURITY

(71) Applicant: Rose Nemeth, Boulder, CO (US)

(72) Inventor: Rose Nemeth, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/219,978

(22) Filed: Apr. 1, 2021

(51) Int. Cl.
G06K 15/02 (2006.01)
G06F 3/12 (2006.01)
G06K 15/00 (2006.01)

(52) U.S. Cl.
CPC ..... *G06K 15/1822* (2013.01); *G06K 15/1836* (2013.01); *G06K 15/4095* (2013.01)

(58) Field of Classification Search
None
See application file for complete search history.

(56) References Cited

U.S. PATENT DOCUMENTS

| 8,817,292 | B1 * | 8/2014 | Rodriguez | G06F 3/1256 358/1.14 |
| 10,331,861 | B2 | 6/2019 | Condon et al. | |
| 2006/0242558 | A1 * | 10/2006 | Racovolis | G06F 40/169 715/205 |
| 2008/0013727 | A1 * | 1/2008 | Uemura | H04N 1/448 380/243 |
| 2010/0007710 | A1 * | 1/2010 | Miyaso | B41J 29/393 347/110 |
| 2010/0161968 | A1 * | 6/2010 | Pravetz | H04L 9/3247 713/156 |
| 2015/0067877 | A1 * | 3/2015 | Lee | G06F 21/10 726/26 |
| 2018/0150619 | A1 * | 5/2018 | Condon | G06F 21/10 |
| 2020/0139631 | A1 * | 5/2020 | Buller | B29C 64/393 |
| 2020/0341702 | A1 * | 10/2020 | Kosaka | H04N 1/0023 |

FOREIGN PATENT DOCUMENTS

JP 2008193612 * 8/2008 ............. G06F 17/21

* cited by examiner

*Primary Examiner* — Beniyam Menberu
(74) *Attorney, Agent, or Firm* — Duft & Bornsen, PC

(57) ABSTRACT

One embodiment comprises a print controller that stores a first print job comprising print data objects and print job commands, processes the print job commands to identify the print data objects for the first print job, selects a subset of the print data objects for processing, and encrypts the subset of the print data objects using a key while the print data objects not selected for processing and the print job commands remain unencrypted, identifies outlines and presentation positions specified for the subset of the print data objects, and generates one or more auxiliary print data objects that graphically represent the outlines and the presentation positions of the subset of the print data objects. The print controller generates a second print job comprising the encrypted print data objects, the auxiliary print data objects, the unencrypted print data objects, and unencrypted print job commands, and provides the second print job.

20 Claims, 9 Drawing Sheets

PRINT JOB ANALYSIS AND SECURITY

FIELD

This disclosure relates to the field of printing systems, and in particular, to analyzing print jobs.

BACKGROUND

Print shop operators may encounter problems when printing a print job for a customer. For example, the printed output of the print job may not match the expected output of the customer and/or the print shop operator. During such events, the print shop operator may utilize a support agent that reviews a trace capture file of the print job in order to determine what may be causing problems with the print job. When the print job includes sensitive information, this sensitive information may be encrypted prior to sending the trace capture file to the support agent, which may make it difficult for the support agent to analyze the print job. However, it also may be undesirable to provide a decryption key to the support agent, as decrypting portions of the print job may expose the sensitive information to the support agent during the analysis of the print job.

Thus, it is apparent that improvements may be made that allow for an analysis for print jobs that include encrypted sensitive information in order to mitigate the printing errors that may arise in the print shop.

SUMMARY

In a print shop, print jobs may be received that include errors, which may be difficult to solve without additional tools. Because some print jobs include sensitive information, such as personal information, bank numbers, etc., there is reluctance in the industry to forward print job data to support staff for analysis, as this potentially may result in the intentional or inadvertent disclosure of the sensitive information. Typically print jobs include print data objects and print job commands, with the print data objects representing the actual print data that is visibly represented on a print medium or a display device, and the print job commands defining or identifying the print data objects in the print jobs in addition to specifying the formatting, rotation, size, fonts, and other control activities that are used to visually display the print data objects.

In the embodiments described herein, print jobs are generated, which include unencrypted print job commands and encrypted print data objects. Because the print data objects are encrypted, access to the print data objects may be prevented unless a decryption key is available. Because the print job commands remain unencrypted in the print jobs, the command structure and other functional features of the partially encrypted print job are viewable, which may allow errors in the print job to be corrected without decrypting the print data objects. In addition to including unencrypted print job commands and encrypted print data objects, the print jobs are generated to visually represent the outlines, presentations positions, and in some cases, attributes of the print data objects that were encrypted. This secondary information allows for the visual inspection of some of the information for the encrypted print data objects, without decrypting the encrypted print data objects.

One embodiment comprises a print controller that stores a first print job comprising print data objects, and print job commands that define the print data objects for the first print job. The print controller processes the print job commands to identify the print data objects for the first print job, selects a subset of the print data objects for processing, and encrypts the subset of the print data objects using a key while the print data objects not selected for processing and the print job commands remain unencrypted. The print controller identifies outlines and presentation positions specified for the subset of the print data objects, and generates one or more auxiliary print data objects that graphically represent the outlines and the presentation positions of the subset of the print data objects. The print controller generates a second print job comprising the encrypted print data objects, the auxiliary print data objects, the unencrypted print data objects, and unencrypted print job commands, and provides the second print job.

Another embodiment comprises a method of encrypting and converting print jobs for analysis. The method comprises storing a first print job comprising print data objects, and print job commands that define the print data objects for the first print job, processing the print job commands to identify the print data objects, selecting a subset of the print data objects for processing, and encrypting the subset of the print data objects using a key while the print data objects not selected for processing and the print job commands remain unencrypted. The method further comprises identifying outlines and presentation positions specified for the subset of the print data objects, and generating one or more auxiliary print data objects that graphically represent the outlines and the presentation positions of the subset of the print data objects. The method further comprises generating a second print job comprising the encrypted print data objects, the auxiliary print data objects, the unencrypted print data objects, and unencrypted print job commands, and providing the second print job.

Another embodiment comprises a non-transitory computer readable medium comprising programmed instructions which, when executed by at least one processor, directs the at least one processor to store a first print job comprising print data objects, and print job commands that define the print data objects for the first print job, to process the print job commands to identify the print data objects, to select a subset of the print data objects for processing, and to encrypt the subset of the print data objects using a key while the print data objects not selected for processing and the print job commands remain unencrypted. The programmed instructions further direct the at least one processor to identify outlines and presentation positions specified for the subset of the print data objects, and to generate one or more auxiliary print data objects that graphically represent the outlines and the presentation positions of the subset of the print data objects. The programmed instructions further direct the at least one processor to generate a second print job comprising the encrypted print data objects, the auxiliary print data objects, the unencrypted print data objects, and unencrypted print job commands, and to provide the second print job.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 1:
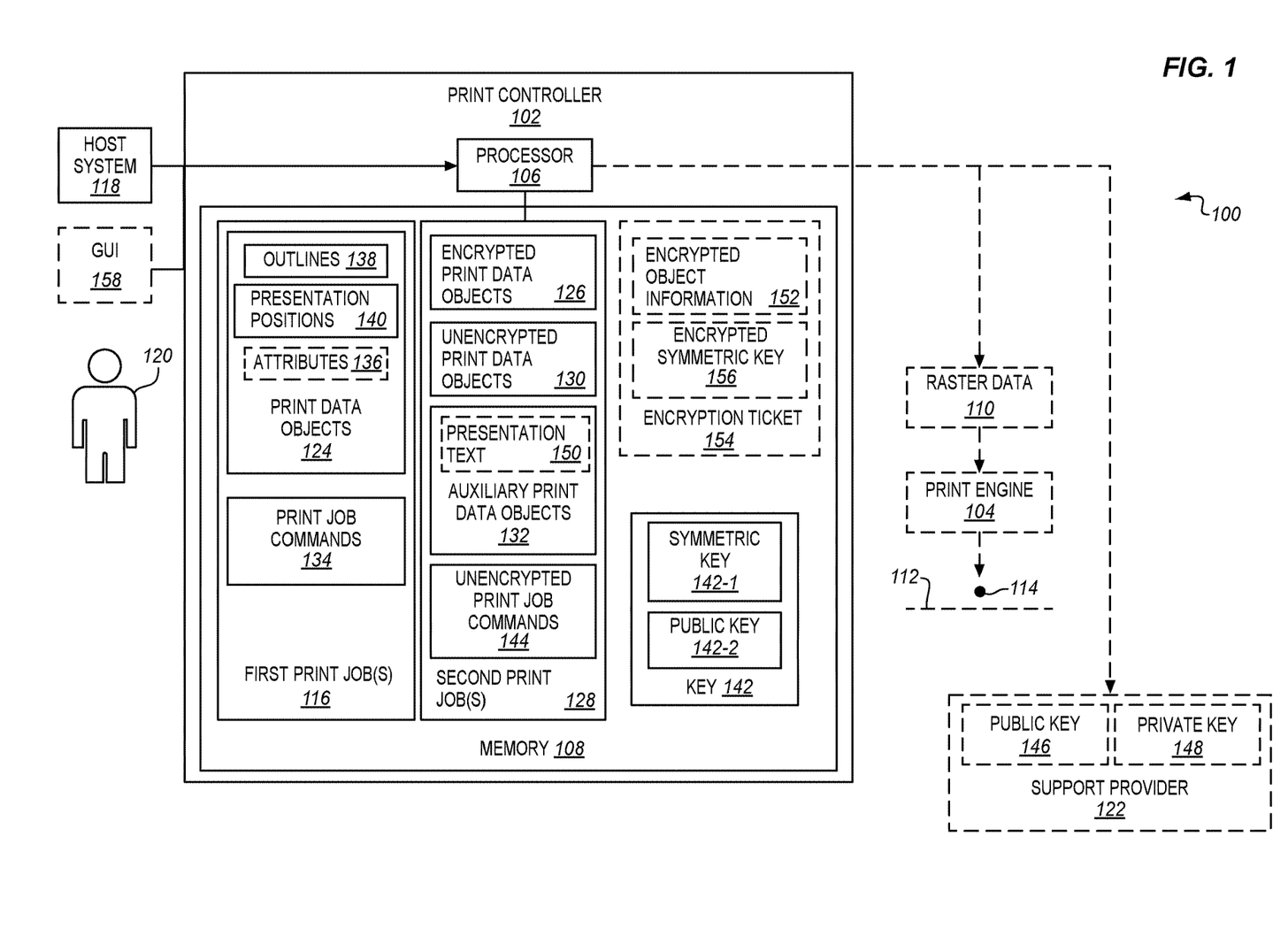
FIG. 1 is a block diagram of a printing system in an illustrative embodiment.

FIG. 1 is a block diagram of a printing system 100 in an illustrative embodiment. Printing system 100 is used in a printing environment, and includes a print controller 102 that controls functions or operations performed in a printing process. Print controller 102 may be included within printing system 100, or may operate outside of printing system 100 as a separate element. Printing system 100 may further include one or more print engine(s) 104 in some embodiments. Print controller 102 may be implemented within print engine 104 in some embodiments.

Print controller 102 may comprise any electronic circuits and/or optical circuits that are able to perform the functions described herein for print controller 102. Print controller 102 may include one or more processors (e.g., a processor 106), Central Processing Units (CPU), Graphics Processing Units (GPU), microprocessors, Digital Signal Processors (DSPs), Application-specific Integrated Circuits (ASICs), Programmable Logic Devices, control circuitry, etc. Some examples of processors include INTEL® CORE™ processors, Advanced Reduced Instruction Set Computing (RISC) Machines (ARM®) processors, etc.

Print controller 102 may further comprise any electronic circuits, and/or optical circuits, and/or magnetic circuits that are able to store data. For instance, print controller 102 may include one or more memories (e.g., a memory 108), volatile or non-volatile Dynamic Random-Access Memory (DRAM) devices, FLASH devices, volatile or non-volatile Static RAM (SRAM) devices, magnetic disk drives, Solid State Disks (SSDs), etc. Some examples of non-volatile DRAM and SRAM include battery-backed DRAM and battery-backed SRAM.

During a printing process in which print jobs are rasterized to generate raster data 110, print controller 102 may transmit or provide raster data 110. Print engine 104 may receive raster data 110, and generate a printed output of the print jobs based on raster data 110. Print engine 104 comprises any system, component, or device that marks a medium 112 with one or more colorant(s) 114. In another embodiment, print engine 104 comprises any system, component, or device that performs a 3-Dimensional printing process, using any suitable material as desired.

Colorant 114 may comprise toner, liquid inks, wax, or any material suitable to mark medium 112. Medium 112 may be continuous form or cut sheet, as desired. Medium 112 may comprise paper, textile, plastic, or any tangible substrate suitable for marking with colorant 114. Print engine 104 may comprise one or more marking engines. For example, print engine 104 may comprise at least one marking engine disposed on each side of medium 112.

In a print shop environment, print controller 102 may receive one or more first print jobs 116 (e.g., from a host system 118) for processing. In some cases, first print jobs 116 may include errors which, when rasterized by processor 106 and printed by print engine 104, results in a printed output that is incorrect. If a print operator 120 is unable to determine the cause of the errors in first print job 116, print operator 120 may utilize a support provider 122 to analyze information about first print job 116 and provide recommendations as to how to resolve the errors in first print job 116. In some embodiments, support provider 122 comprises a remote entity with respect to printing system 100, with expertise in analyzing and resolving errors in the commands, formatting, structure, and/or assembly of first print jobs 116. In other embodiments, support provider 122 comprises a local entity with respect to printing system 100, who also may have expertise in analyzing and resolving errors in the commands, formatting, structure, and/or assembly of first print jobs 116.

Although errors in first print job 116 may be uncommon, errors may arise for a number of reasons. For instance, a customer may generate first print job 116 at host system 118 having images in a first data format, and accidentally specify in first print job 116 that the images are in a second data format. In this example, when processor 106 generates raster data 110 with the image format error in first print job 116, the image data may be interpreted incorrectly by processor 106, resulting in a printed output that is incorrect. In some cases, errors in first print jobs 116 may be difficult to diagnose. For instance, first print jobs 116 may include thousands of printable features that are spatially related to each other, partially overlay each other, have transparency aspects with respect to each other, etc.

In prior systems, a print shop employee may generate a trace file during a debug process, which captures and forwards data from jobs to a support specialist. However, because the jobs may include sensitive information, such as bank account numbers, patient information, address information, or other types of personally-identifiable and/or sensitive information, providing the trace file to the support specialist potentially exposes the sensitive information to another party, which is undesirable. While one solution may be to encrypt the jobs in their entirety prior to submitting the trace file to the support specialist, this approach prevents the support specialist from analyzing the information in the trace file without first decrypting the job, which defeats the purpose of securing the sensitive information which may be present in jobs. Further, if the sensitive information in the job is encrypted prior to sending the trace file to the support specialist, then the support specialist may recommend decrypting the sensitive information in order to determine the errors in the job, which may also be undesirable.

In the embodiments described herein, a subset of print data objects 124 in first print job 116 are selected for processing, and are encrypted to generate encrypted print data objects 126 for one or more second print jobs 128. Print data objects 124 that are not selected for processing remain unencrypted in second print jobs 128 as unencrypted print data objects 130. In addition, the subset of print data objects 124 selected for processing are converted into auxiliary print data objects 132 in second print jobs 128, and represent printable features that, once printed or rendered into a displayable format on an electronic display, reveal information about encrypted print data objects 126 without decrypting encrypted print data objects 126.

First print jobs 116 further include print job commands 134, which comprise any type of data structure that defines print data objects 124 for first print jobs 116. In some embodiments, print data objects 124 comprise inline data within first print jobs 116, and print job commands 134 define the data boundaries within first print jobs 116 for print data objects 124. In other embodiments, print data objects 124 are external data objects, and print job commands 134 define the data boundaries within first print jobs 116 for references to print data objects 124. Unencrypted print job commands 144 in second print job 128 may be substantially similar to print job commands 134 in first print job, thereby allowing for the analysis and inspection of second print job 128 without performing a decryption step on second print job 128 (e.g., by support provider 122).

Print job commands 134 and/or print data objects 124 may further define attributes 136 for print data objects 124. Some examples of attributes 136 include formatting information, rotation, size, transparency, background colors, resource ID's, type of print data objects 124, information encoded by print data objects 124, statistics on drawing orders, statistics on data sub-types in object containers, etc. The information encoded by print data objects 124 and represented by attributes 136 may include text data for print data objects 124 (e.g., actual text data represented by print data objects 124, portions of the text data represented by print data objects 124, human readable information associated with bar codes, etc.).

Print job commands 134 and/or print data objects 124 may further define outlines 138 and presentation positions 140 for print data objects 124 in a presentation space of first print jobs 116. Outlines 138 represent the boundaries of print data objects 124 in the presentation space of first print jobs 116, and presentation positions 140 define the locations of print data objects 124 in the presentation space of first print jobs 116. For example, if a logical page (e.g., a presentation space) includes two images, each image and/or print job commands 134 that define or reference the images may have information that specifies the size of the images and their positions in the presentation space of the logical page.

Figure 2:
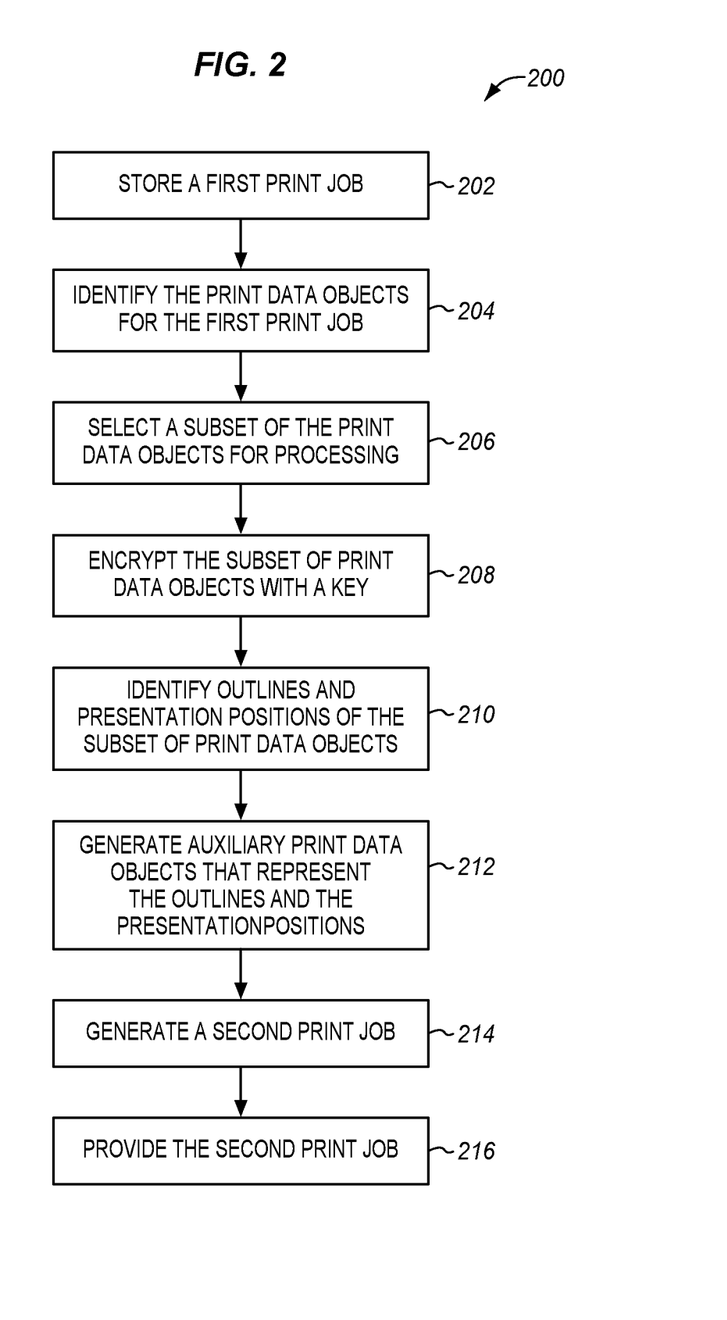
FIG. 2 is flow chart of a method of encrypting and converting print jobs for analysis in an illustrative embodiment.

Consider that print controller 102 is operational and ready to begin processing first print jobs 116. FIG. 2 is a flow chart of a method 200 of encrypting and converting print jobs for analysis in an illustrative embodiment. FIGS. 3-6 depict additional details of method 200 in illustrative embodiments, and FIGS. 7-8 visually represent first print job 116 and second print job 128 at various steps in the performance of method 200 in illustrative embodiments.

Method 200 will be discussed with respect to printing system 100 FIG. 1, although method 200 may be performed by other systems, not shown. The steps of the flow charts described herein may include other steps that are not shown. Also, the steps of the flow charts described herein may be performed in an alternate order.

Referring to FIG. 2, processor 106 receives first print job 116 (e.g., from host system 118), and stores first print job 116 in memory 108 (see step 202). First print job 116 may represent a job submitted by a customer for production printing. First print job 116 may utilize a Page Description Language (PDL) to describe print data objects 124 in first print job 116. Some examples of a PDL include the Portable Document Format (PDF), an Intelligent Printer Data Stream (IPDS), POSTSCRIPT®, etc.

Processor 106 analyzes print job commands 134 in first print job 116 to identify print data objects 124 for first print job 116 (see step 204). For example, IPDS is a host-to-printer data stream for Advanced Function Presentation (AFP) architectures. IPDS provides an attachment-independent interface for controlling and managing AFP printers, allowing the presentation of pages containing an unlimited mixture of different data types, including text, images, graphics, bar codes, and object containers. IPDS allows different applications, which can be independent of each other, to create source data (e.g., graphics, images, bar codes, text). The IPDS architecture allows the output of these independent applications to be merged at print time, so that an integrated mixed-data page is the result.

An IPDS data stream includes data and controls defined through self-identifying structured fields, called IPDS commands, which describe the presentation of print data. Thus, in embodiments that utilize first print jobs 116 formatted in IPDS, processor 106, when identifying print data objects 124 for first print job 116, may parse first print job 116 to identify the IPDS structured fields in first print job 116 that define the different types of print data objects 124. Some examples of print job commands 134 in the IPDS format are described below.

One example of print job commands 134 that may be found within first print jobs 116 are located in a text command set. The text command set is composed of IPDS commands for presenting text information in a page, a page segment, or an overlay. The text command set includes, in part, a Write Text Control (WTC) command and a Write Text (WT) command. The WTC command defines the text presentation space, the text object area, and the mapping of the text presentation space into the text object area. The WT command is used to identify text for first print jobs 116 (i.e., a type of print data object 124). The WT command is used to transmit up to 32K bytes of character data and controls to a printer. This data is part of a text object, page segment, or overlay, depending on the state of the printer. The WT command carries Presentation Text Object Content Architecture (PTOCA) data and PTOCA control sequences.

Another example of print job commands 134 that may be found within first print jobs 116 are located in an IM-Image command set. The IM-Image command set is composed of IPDS commands for presenting image raster data on a logical page, a page segment, or an overlay. The IM-Image command set includes, in part, a Write Image Control (WIC) command and a Write Image (WI) command. The WIC command defines the IM image object area on the current page, page segment, or overlay. The WI command transmits IM-Image data (i.e., a type of print data object 124) as a sequence of scan lines.

Another example of print job commands 134 that may be found within first print jobs 116 are part of an 10-Image command set. The 10-Image command set is composed of IPDS commands for presenting Image Object Content Architecture (IOCA) image data in a page, a page segment, or an overlay. The 10-Image command set includes, in part, a Write Image Control 2 (WIC2) command and Write Image 2 (WI2) command. The WIC2 command defines the image presentation space, the image object area, and the mapping of the image presentation space into the image object area. The WI2 command is used to identify IOCA image data (i.e., a type of print data object 124) for first print jobs 116. The WI2 command transmits IOCA image data and the parameters that define the image data. Some IPDS printers allow an IO Image to be downloaded in home state as a data object resource.

Another example of print job commands 134 that may be found within first print jobs 116 are part of a graphics command set. The graphics command set is composed of IPDS commands and data controls for presenting graphical pictures on a page, a page segment, or an overlay. The graphic command set includes, in part, a Write Graphics Control (WGC) command and a Write Graphics (WG) command. The WGC command defines the graphics presentation space window, defines the graphics object area, maps the graphics presentation space window into the graphics object area, and establishes the initial conditions for interpreting the graphics data. The WG command transmits graphics data (i.e., a type of print data object 124). The data comprises graphics segments that include the drawing orders that define the picture in the graphics presentation space.

Another example of print job commands 134 that may be found within print jobs are part of a bar code command set. The bar code command set includes IPDS commands and controls for presenting bar-coded information on a page, a page segment, or an overlay. The bar code command set includes, in part, a Write Bar Code Control (WBCC) command and a Write Bar Code (WBC) command. The WBCC command defines the bar code presentation space, defines the bar code object area, maps the bar code presentation space into the bar code object area, and establishes the initial conditions for printing the bar code data. The WBC command is used to identify bar codes (i.e., a type of print data object 124) for first print jobs 116. The WBC command transmits Bar Code Object Content Architecture (BCOCA) symbol data for a bar code, including parameters that locate the bar code symbol origin within a bar code object area.

Another example of print job commands 134 that may be found within first print jobs 116 are part of an object container command set. The object container command set includes IPDS commands for downloading presentation object containers, and for downloading, managing, and including data object resources and data-object-font components. The object container command set includes, in part, a Write Object Container Control (WOCC) command and a Write Object Container (WOC) command. The WOCC command causes a printer to enter an object-container, page-object-container, or overlay-object-container state. For presentation objects, the parameters of the WOCC command define, position, and orient the object container object area, map the object container presentation space into the object container area, and establish the initial conditions for interpreting the object container data. The WOC command transmits object container data (e.g., which may be used to represent different types of print data objects 124 stored in object containers). The type of data in the WOC command is specified in the WOCC command.

Referring again to FIG. 2, processor 106 selects the subset of print data objects 124 for processing (see step 206). For example, processor 106 may select certain types of print data objects 124 and not others, depending on which print data objects 124 include sensitive information. In another example, processor 106 may use external information (e.g., provided by print operator 120) to select the subset of print data objects 124 in first print job 116 for processing.

Processor 106 encrypts the subset of print data objects 124 using a key 142 in order to generate encrypted print data objects 126 for second print job 128, while print data objects 124 that are not selected for processing and print job commands 134 remain unencrypted in second print job 128 (see FIG. 1, and FIG. 2, step 208). In particular, print data objects 124 that remain unencrypted correspond to unencrypted print data objects 130 in second print job 128, and print job commands 134 in first print job 116 that remain unencrypted correspond to unencrypted print job commands 144 in second print job 128. Unencrypted print job commands 144 in second print job may be substantially the same as print job commands 134 in first print job 116, such that second print job 128 retains a similar structure as first print job 116.

Referring to FIG. 1, key 142, which is used to encrypt the subset of print data objects 124 in first print job 116, may comprise a symmetric key 142-1 or a public key 142-2 in some embodiments. In one embodiment, public key 142-2 comprises a public key 146 of support provider 122, which may be used to encrypt the subset of print data objects 124 in first print job 116 that have been selected for processing.

Symmetric key algorithms in cryptography use the same key for both encrypting plain text data and decrypting cypher text data. Symmetric key algorithms may comprise either stream ciphers or block ciphers. For example, print controller 102 may use a block cipher to encrypt the subset of print data objects 124 selected for processing using symmetric key 142-1 during a job trace operation (e.g., when generating a partially encrypted trace file for analysis). One example of a block symmetric encryption algorithm is the Advanced Encryption Standard (AES), which uses a block length of 128 bits and three different encryption key lengths of 128, 192, or 256 bits.

Asymmetric cryptography is a cryptographic system which uses pairs of keys. Public keys, which are known by others, and private keys, which are secret and known to the key-pair owner. Key pairs in this type of system allow the owner to publish the public key, which is used by others to encrypt plain text to generate cypher text. The private key is then used by the key-pair owner to decrypt the cypher text to recover the plain text. Asymmetric cryptography relies on a one-way functional nature of a two-key asymmetric cryptography system, which constrains the public key to the singular option of encrypting data. The public key cannot be used to decrypt the cypher text in this type of encryption system. This ensures that if processor 106 uses public key 146 of support provider 122 to encrypt the subset of print data objects 124 selected for processing in first print job 116, then support provider 122, who retains a private key 148 that is secret, has the exclusive ability to perform a decryption process using private key 148 to recover the plaintext versions of encrypted print data objects 126.

Referring again to FIG. 2, processor 106 identifies outlines 138 and presentation positions 140 specified for the subset of print data objects 124 selected for processing (see step 210). Processor 106 may, for example, analyze print job commands 134, and/or print data objects 124 in first print job 116 in order to determine outlines 138 and presentation positions 140. If first print job 116 is formatted in IPDS, then processor 106 may analyze any of the previously described command sets and or print data objects 124 defined by those command sets, in order to identify outlines 138 and/or presentation positions 140. For example, if a bar code type of print data object 124 is being analyzed in first print job 116, then a bar code object area defined in the WBCC command may be used to identify outlines 138 and/or presentation position 140 for the bar code in a presentation space of first print job 116.

In response to identifying outlines 138 and presentation positions 140 for the subset of print data objects 124 selected for processing, processor 106 generates one or more auxiliary print data objects 132 for second print job 128 that graphically represent outlines 138 and presentation positions 140 of the subset of print data objects 124 selected for processing (see step 212). Processor 106 generates second print job 128, which includes encrypted print data objects 126, unencrypted print data objects 130, auxiliary print data objects 132, and unencrypted print job commands 144 (see step 214). Processor 106 provides second print job (see step 216). In one embodiment, processor 106 provides second print job 128 to a destination that renders second print job 128 for presentation on an electronic display device (e.g., a monitor). In another embodiment, processor 106 rasterizes second print job 128 to generate raster data 110, which may be received by print engine 104. Print engine 104 may then generate a printed output of second print job 128 by marking medium 112 with colorant 114. In another embodiment, processor 106 directs a Graphical User Interface (GUI) 158 to visually display a rendering of second print job 128. GUI 158 comprises any component, system, or device that displays information to print operator 120, and allows print operator 120 to interact with printing system 100. GUI 158 may comprise electronic displays, pointing devices, keyboards, mice, touch screens, or any combination thereof that allows print operator 120 and printing system 100 to interact with each other.

Figure 7:
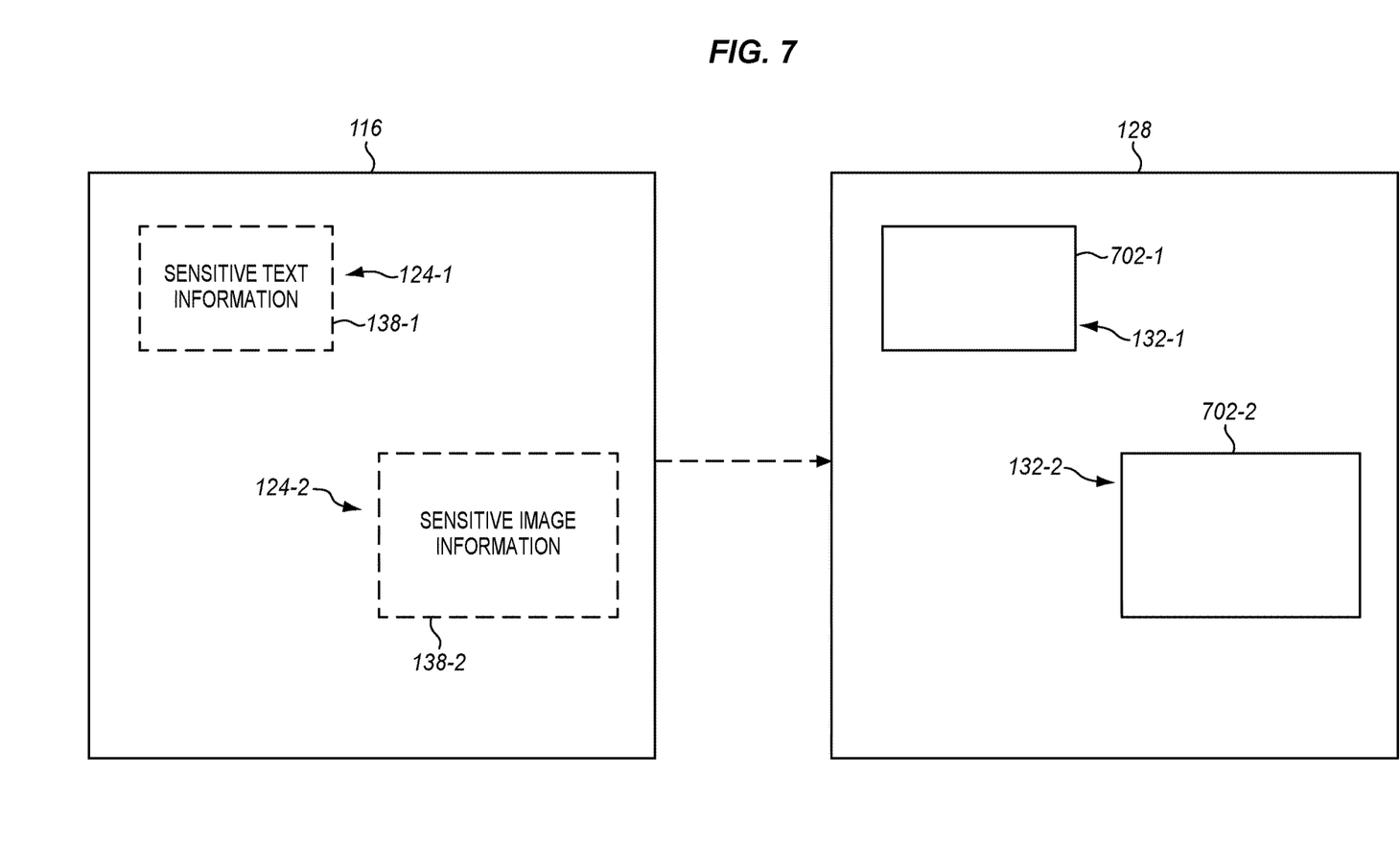
FIGS. 7-8 visually represent print jobs at various steps in the performance of the method of FIG. 2 in illustrative embodiments.

FIG. 7 is a visual representation of first print job 116 and second print job 128 in an illustrative embodiment. FIG. 7 depicts first print job 116 including the subset of print data objects 124 selected for processing based on method 200, and further displays second print job 128 with auxiliary print data objects 132 that graphically represent outlines 138 and presentation positions 140 for the print data objects 124. Encrypted print data objects 126 are not shown in FIG. 7. In the embodiment depicted in FIG. 7, print data object 124-1 in first print job 116 comprises a text object having an outline 138-1 in a presentation space of first print job 116, and print data object 124-2 in first print job 116 comprises an image object, having outline 138-2 in a presentation space of first print job 116.

Further in this embodiment, second print job 128 visually represents the result of performing method 200, with auxiliary print data object 132-1 graphically representing outline 138-1 for print data object 124-1 using boundary 702-1, and auxiliary print data object 132-2 graphically representing outline 138-2 for print data object 124-2 using boundary 702-2. Each of boundary 702-1 and boundary 702-2 are visually displayed when second print job 128 is rendered or printed. Boundary 702-1 and boundary 702-2 may be generated, for example, using one or more draw rules and/or background colors specified by auxiliary print data objects 132 when auxiliary print data objects 132 are IPDS text objects.

Generally, auxiliary print data objects 132 graphically represent outlines 138 of print data objects 124 in a presentation space of first print job 116, and also represent presentation positions 140 of print data objects 124 relative to each other in the presentation space of first print job 116. For instance, boundary 702-1 of auxiliary print data object 132-1 and boundary 702-2 of auxiliary print data object 132-2 in second print job 128 enclose an area having a size and a relative position with respect to each other that corresponds to outline 138-1 of print data object 124-1 and outline 138-2 of print data object 124-2, respectively, in a presentation space of first print job 116.

In some embodiments, processor 106, when generating second print job 128, may include additional information about print data objects 124 that is visible when second print job 128 is printed or displayed. This type of additional information may be helpful when analyzing second print job 128.

Figure 3:
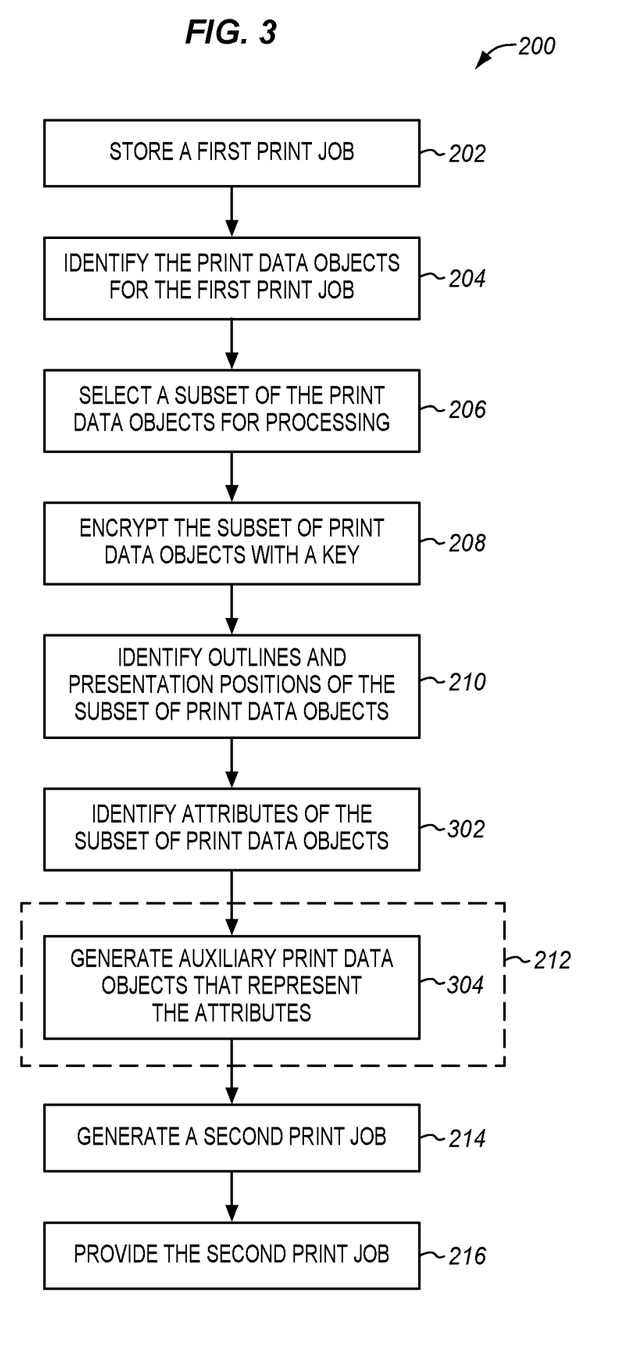
FIGS. 3-6 depict additional details of method 200 in illustrative embodiments.

Referring to FIG. 3, processor 106 identifies attributes 136 of print data objects 124 (see step 302), and generates auxiliary print data objects 132 to graphically represent attributes 136 as presentation text 150 (see step 304). Attributes 136 may include any type of information about print data objects 124. Some examples of attributes 136 include a type of print data object 124 (e.g., text, images, graphics, bar codes, etc.), a format of print data object 124 (e.g., Joint Photographic Experts Group (JPEG), Tag Image File Format (TIFF), etc.). Some additional examples of attributes 136 include a resource identifier of print data objects 124 (OID's used to identify print data objects 124), human readable information for bar codes, and/or a color space of print data objects 124 (e.g., CIELAB, RGB, sRGB, etc.).

Figure 8:
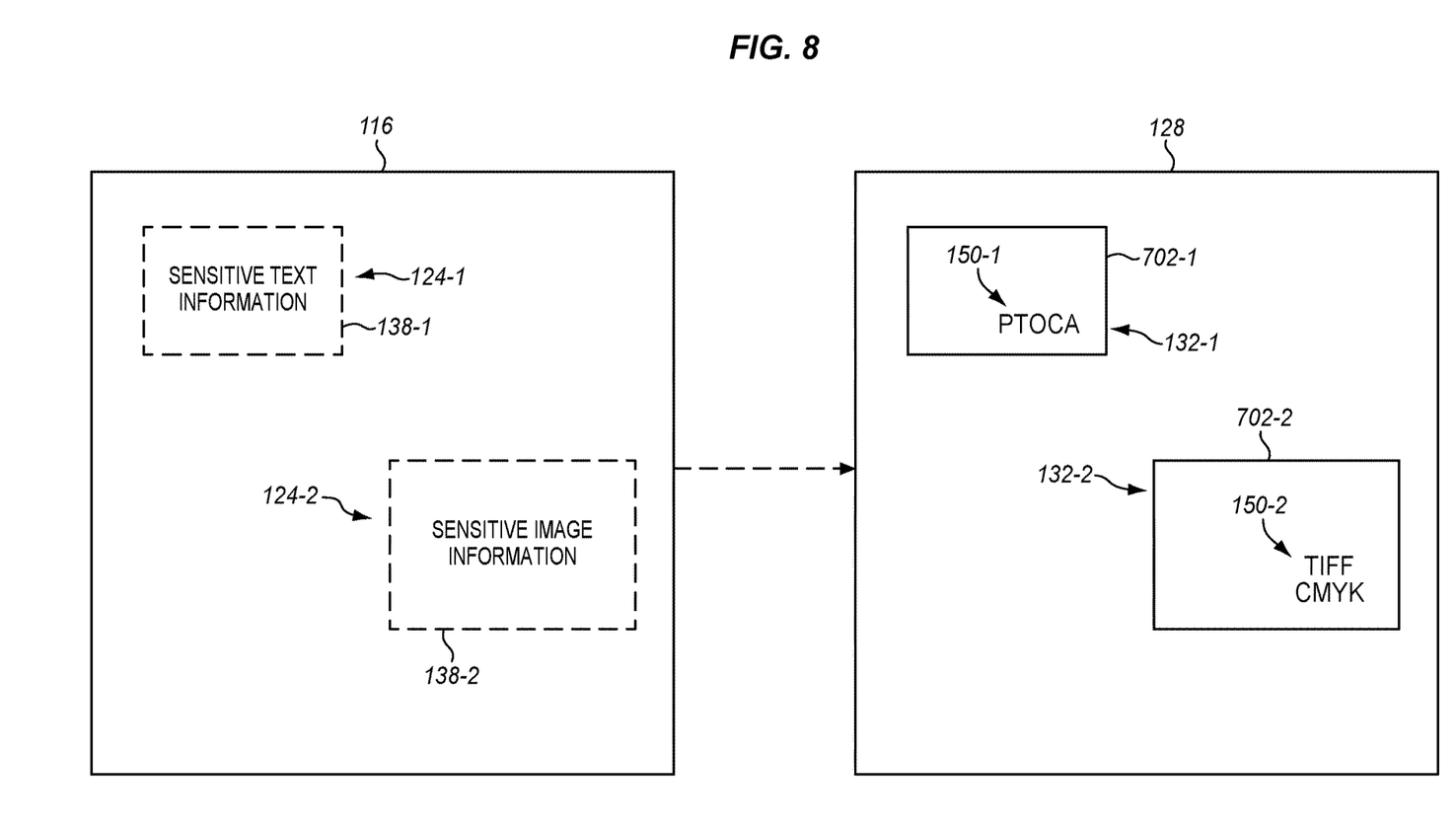

FIG. 8 is a visual representation of first print job 116 and second print job 128 in another illustrative embodiment. FIG. 8 depicts first print job 116 with print data objects 124 as previously described with respect to FIG. 7, and second print job 128 with auxiliary print data objects 132 as previously described with respect to FIG. 6. However, in this embodiment, auxiliary print data objects 132 include presentation text 150 that graphically represents attributes 136 for print data objects 124. In this embodiment, presentation text 150-1 includes information about print data object 124-1, which is a text object in this embodiment, and presentation text 150-2 includes information about print data object 124-2, which is an image in this embodiment.

The use of presentation text 150 in second print job 128 provides additional information regarding print data objects 124 that may be used during the analysis of second print job 128. Presentation text 150 generated by auxiliary print data objects 132 may be positioned anywhere relative to its boundary 702 in a presentation space, but in one embodiment, presentation text 150 is graphically represented within boundaries 702 of auxiliary print data objects 132 (e.g., presentation text 150-1 is located within boundary 702-1 of auxiliary print data object 132-1).

As discussed briefly above, first print job 116 and/or second print job 128 may comprise IPDS jobs in some embodiments. In these embodiments, second print job 128 may implement boundaries 702 and/or presentation text 150 using any type of presentation data objects in the IPDS format as desired. In one particular embodiment, auxiliary print data objects 132 comprise text objects or text-major, which are generated to graphically represent outlines 138 and presentation positions 140, and in some embodiments, attributes 136 of print data objects 124. For instance, text objects in IPDS include the ability to display a background color, which may be used to represent outlines 138 and presentation positions 140 of print data objects 124 in a presentation space of second print job 128. Text-major text in IPDS provides the implementation of one or more draw rules, which may be used to represent outlines 138 and presentation positions 140 of print data objects 124 in a presentation space of second print job 128. Both text objects and text-major text include the ability to display presentation text 150 in a presentation space of second print job 128, allowing for attributes 136 of print data objects 124 to be displayed when second print job 128 is printed or rendered.

In some cases, it may be desirable to select some of print data objects 124 in first print job 116 for processing and not others. For example, if the sensitive information in first print job 116 is represented by text print data, but the remaining print data in first print job 116 does not include sensitive information, then it may be desirable to process the text print data in first print job 116, while not processing the other types of print data, such as image data.

Figure 4:
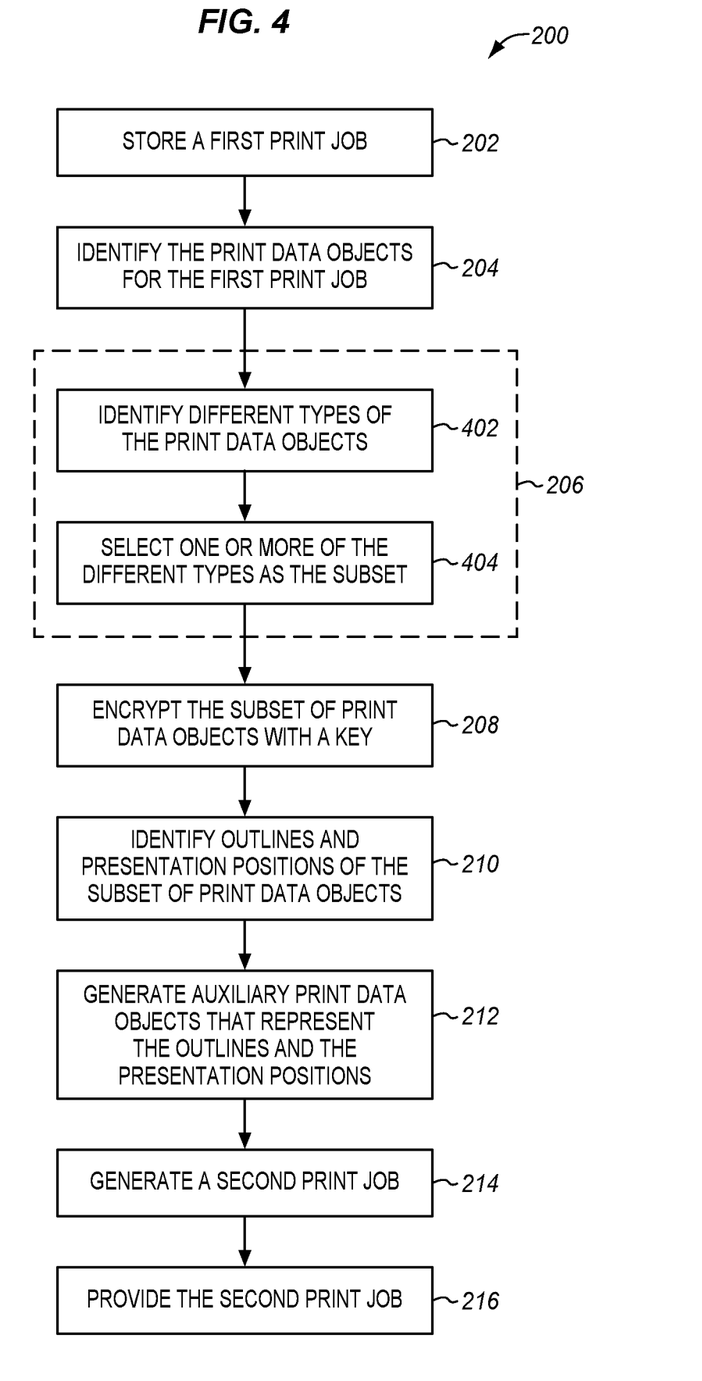

This embodiment is depicted in the flow chart of FIG. 4. To differentially process print data objects 124 in first print job 116, processor 106 identifies different types of print data objects 124 in first print job 116 (see step 402). As discussed above, any number of different types of print data objects 124 may be part of first print job 116, including images, graphics, text, bar codes, etc. In response to processor 106 analyzing first print job 116 to determine the different types of print data objects 124 for first print job 116, processor 106 may select one or more of the different types of print data objects 124 as the subset of print data objects 124 to process according to method 200 (see step 404). In one embodiment, processor 106 may display the different types of print data objects to print operator 120 utilizing GUI 158, thereby allowing print operator 120 to select the type(s) of print data objects 124 that will be processed during the performance of method 200.

As discussed above with respect to method 200 of FIG. 2, second print job 128 generally includes encrypted versions for a subset of print data objects 124 in first print job 116 that are selected for processing, along with graphical representations of the outlines 138 and presentation positions 140 for the subset of print data objects 124 that are selected for processing. When second print job 128 includes encrypted print data objects 126 that have been encrypted using symmetric key 142-1, and symmetric key 142-1 is not known to support provider 122, support provider 122 is able to analyze the command structure of first print job 116 using unencrypted print job commands 144, while support provider 122 is prevented from accessing encrypted print data objects 126 in second print job 128 unless support provider 122 is provided access to symmetric key 142-1. Further, because second print job 128 also includes auxiliary print data objects 132, which graphically represent outlines 138 and presentation positions 140 for the subset of print data objects 124 that were encrypted (e.g., encrypted print data objects 126 in second print job 128), support provider 122 is provided information about encrypted print data objects 126 in second print job 128, even though support provider 122 may not have access to symmetric key 142-1.

Figure 5:
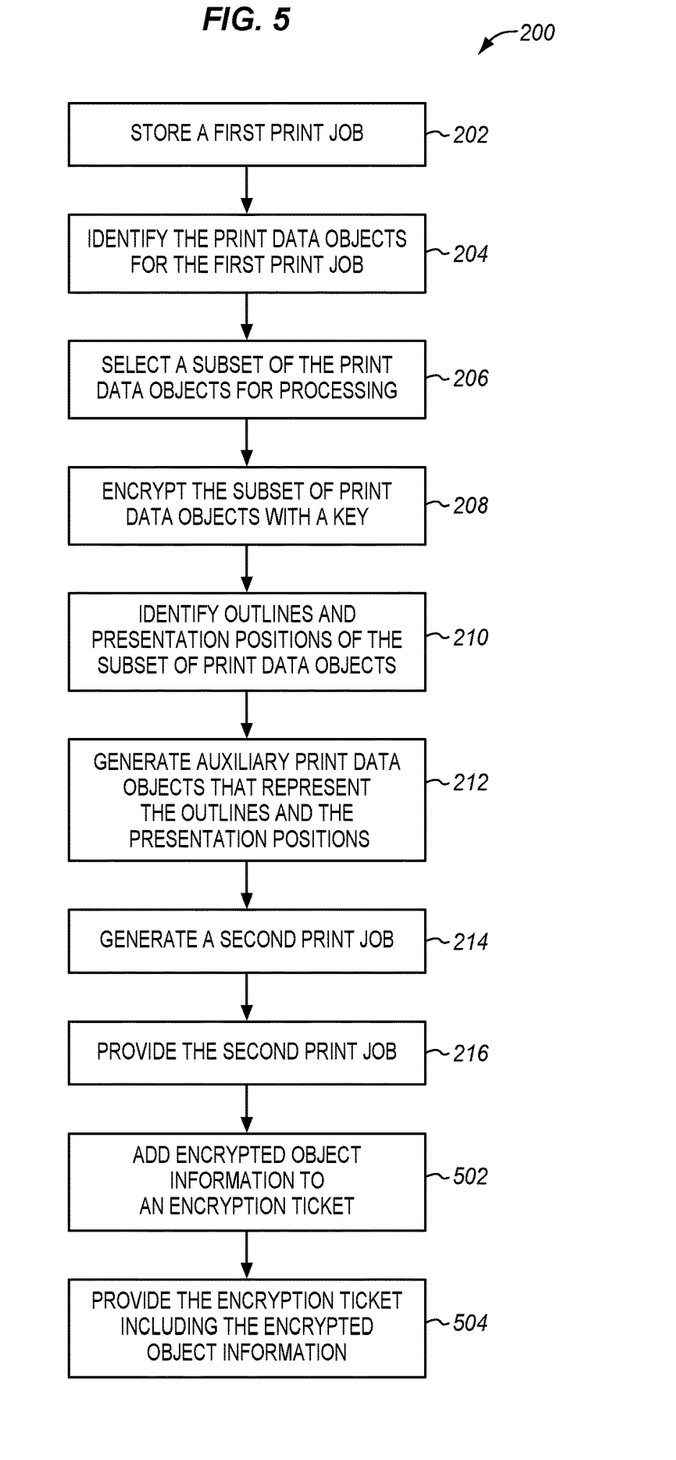

Referring to FIG. 1 and FIG. 5, processor 106 may add encrypted object information 152 to an encryption ticket 154 (see step 502), and provide an encryption ticket 154 (see step 504). For example, processor 106 may provide encryption ticket 154 to support provider 122. Encrypted object information 152 in encryption ticket 154 identifies encrypted print data objects 126 in second print job 128. Encryption ticket 154 may be used, for example, by support provider 122 to identify encrypted print data objects 126 in second print job 128 during a decryption process. For instance, if processor 106 uses public key 146 of support provider 122 to generate encrypted print data objects 126 in second print job 128, then encrypted object information 152 in encryption ticket 154 may be used by support provider 122 along with private key 148 in order to selectively decrypt encrypted print data objects 126. Further, encryption ticket 154 may be used, for example, by support provider 122 to identify encrypted print data objects 126 in order to access their corresponding auxiliary print data objects 132. For instance, rather than decrypting encrypted print data objects 126 (which may not be possible if support provider 122 does not have access to symmetric key 142-1), support provider 122 may instead generate an output of second print job 128 that visually displays information about encrypted print data objects 126 using auxiliary print data objects 132.

Figure 6:
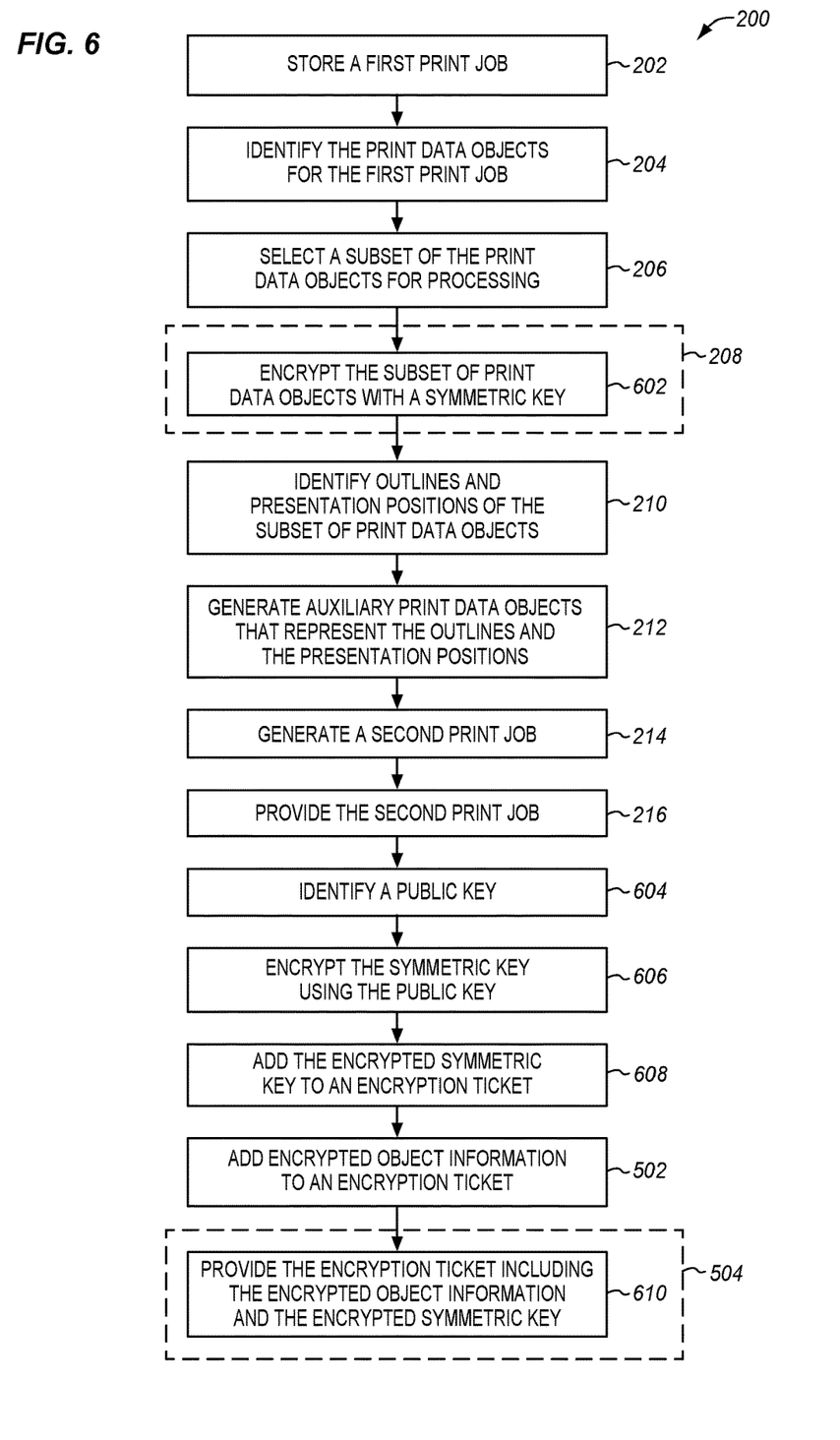

Referring to FIG. 6, it may be desirable in some cases to securely provide support provider 122 with access to symmetric key 142-1, when symmetric key 142-1 is unknown to support provider 122 and is used to encrypt the subset of print data objects 124 selected for processing (see step 602 of FIG. 6). Further, it may be desirable to not expose the plaintext version of symmetric key 142-1 outside of print controller 102. To do so, processor 106 may identify public key 146 of support provider 122 (see step 604), and encrypt symmetric key 142-1 using public key 146 to generate encrypted symmetric key 156 (see step 606 of FIG. 6 and FIG. 1). Processor 106 adds encrypted symmetric key 156 to encryption ticket 154 (see step 608), and provides encryption ticket 154 (see step 610). For example, processor 106 may provide encryption ticket 154 to support provider 122. Support provider 122 may use private key 148 to decrypt encrypted symmetric key 156 to recover symmetric key 142-1. Using symmetric key 142-1 and encrypted object information 152 in encryption ticket 154, support provider 122 may then decrypt encrypted print data objects 126 of second print job 128.

In one embodiment, processor 106 may additionally or alternatively identify (e.g., receive from GUI 158 or other elements of printing system 100) any combination of attribute information such as print data objects 124, key 142, an apparatus identifier (e.g., serial number, model number, location, and/or etc.), a print system code level, a time stamp, operator descriptive information, a problem record number, a trace file and a trace file name. Processor 106 may add the identified attribute information to encryption ticket 154. In another embodiment, encryption ticket 154 may be a data list that comprises attribute identifiers and the corresponding attribute values.

The use of second print job 128 provides the ability to diagnose problems for first print jobs 116 while ensuring that the sensitive information within first print jobs 116 remains secure, providing a technical benefit over the prior art. Further, auxiliary print data objects 132 in second print job 128 provides additional information about encrypted print data objects 126, even when the ability to decrypt encrypted print data objects 126 is prevented, which also provide a technical benefit over the prior art.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as programmed instructions executable by a processor or a computer to perform the functions of the element. Some examples of programmed instructions are software, program code, and firmware. The programmed instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Figure 9:
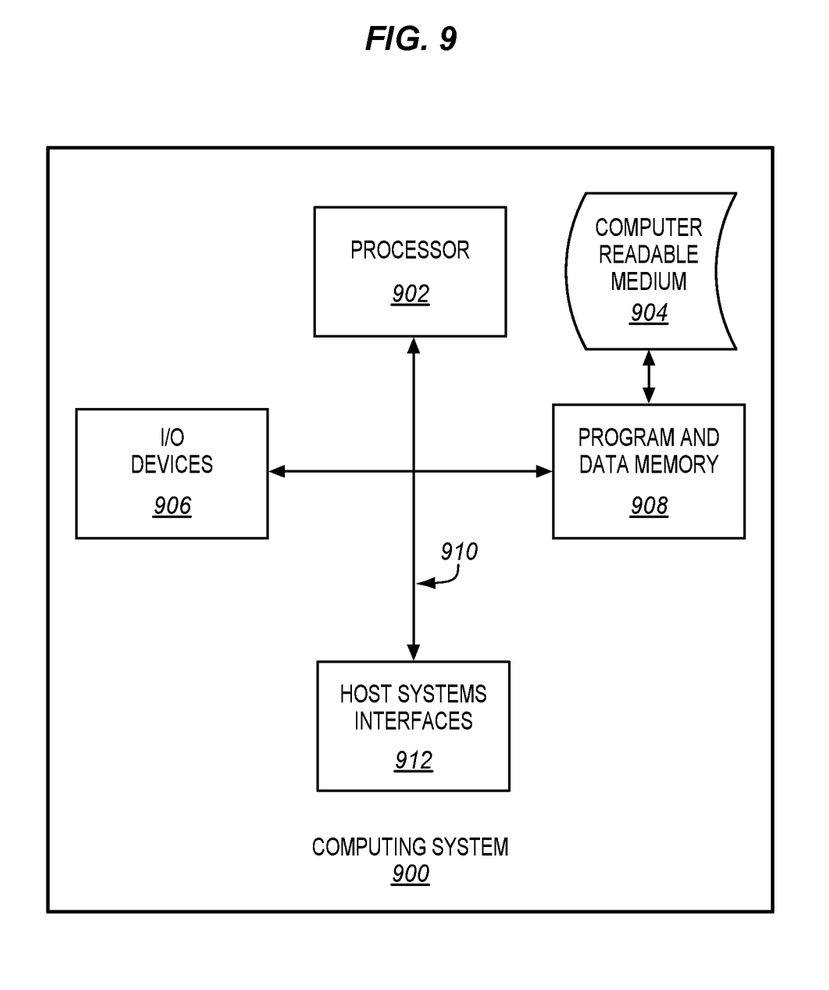
FIG. 9 illustrates a computing system in which a computer readable medium may provide instructions for performing any of the functionality disclosed herein.

In one embodiment, the invention is implemented in software, which includes but is not limited to firmware, resident software, microcode, etc. FIG. 9 illustrates a computing system 900 in which a computer readable medium 904 may provide instructions for performing any of the functionality disclosed herein.

Furthermore, the invention can take the form of a computer program product accessible from computer readable medium 904 that provides program code for use by or in connection with a processor or any instruction execution system. For the purposes of this description, computer readable medium 904 can be any apparatus that can tangibly store the program for use by or in connection with the instruction execution system, apparatus, or device, including computing system 900.

Computer readable medium 904 can be any tangible electronic, magnetic, optical, electromagnetic, infrared, or semiconductor system (or apparatus or device). Examples of computer readable medium 904 include a semiconductor or solid-state memory, magnetic tape, a removable computer diskette, a random-access memory (RAM), a read-only memory (ROM), a rigid magnetic disk and an optical disk. Some examples of optical disks include compact disk—read only memory (CD-ROM), compact disk—read/write (CD-R/W) and DVD.

Computing system 900, suitable for storing and/or executing program code, can include one or more processors 902 coupled directly or indirectly to memory 908 through a system bus 910. Memory 908 may include local memory employed during actual execution of the program code, bulk storage, and cache memories which provide temporary storage of at least some program code in order to reduce the number of times code is retrieved from bulk storage during execution. Input/output (IO) devices 906 (including but not limited to keyboards, displays, pointing devices, etc.) can be coupled to the system either directly or through intervening IO controllers. Network adapters may also be coupled to the system to enable computing system 900 to become coupled to other data processing systems, such as through host systems interfaces 912, or remote printers or storage devices through intervening private or public networks. Modems, cable modem and Ethernet cards are just a few of the currently available types of network adapters.

Although specific embodiments were described herein, the scope is not limited to those specific embodiments. Rather, the scope is defined by the following claims and any equivalents thereof.

What is claimed is:

1. A printing system, comprising:
a print controller, comprising:
a memory configured to store a first print job comprising print data objects, and print job commands that define the print data objects for the first print job; and
at least one processor configured to process the print job commands to identify the print data objects for the first print job, to select a subset of the print data objects for processing, and to encrypt the subset of the print data objects using a key while the print data objects not selected for processing and the print job commands remain unencrypted,
the at least one processor configured to identify outlines and presentation positions specified for the subset of the print data objects, by analyzing Page Description Language (PDL) contents of the first print job that define the subset of the print data objects, and to generate one or more auxiliary print data objects that graphically represent the outlines and the presentation positions of the subset of the print data objects, and
the at least one processor configured to generate a second print job comprising the encrypted print data objects, the auxiliary print data objects, the unencrypted print data objects, and unencrypted print job commands, and to provide the second print job.

2. The printing system of claim 1, wherein:
the at least one processor is configured to identify attributes of the subset of the print data objects, and to generate the auxiliary print data objects to represent the attributes as presentation text.

3. The printing system of claim 2, wherein the attributes comprise at least one of:
a type of the print data objects;
a resource identifier of the print data objects;
a format of the print data objects;
human readable information represented by the print data objects; and
a color space of the print data objects.

4. The printing system of claim 1, wherein:
the at least one processor is configured to identify different types of the print data objects for the first print job, and to select at least one of the different types of the print data objects as the subset of the print data objects selected for processing.

5. The printing system of claim 1, wherein:
the at least one processor is configured to add encrypted object information to an encryption ticket that identifies the encrypted print data objects in the second print job, and to provide the encryption ticket comprising the encrypted object information.

6. The printing system of claim 5, wherein:
the key comprises a symmetric key, and
the at least one processor is configured to identify a public key, to encrypt the symmetric key using the public key to generate an encrypted symmetric key, to add the encrypted symmetric key to the encryption ticket, and to provide the encryption ticket comprising the encrypted object information and the encrypted symmetric key.

7. The printing system of claim 1, wherein:
the at least one processor is configured to rasterize the second print job to generate raster data, and to transmit the raster data to a destination, and
the printing system further comprises:
at least one print engine configured to receive the raster data, and to mark at least one colorant onto a medium based on the raster data to generate a printed output of the second print job.

8. The printing system of claim 1, wherein:
the second print job comprises an Intelligent Printer Data Stream (IPDS) print job,
the auxiliary print data objects comprise at least one of text objects and text-major text, the text objects graphically represent the outlines and the presentation positions of the subset of the print data objects using background colors, and the text-major text graphically represent the outlines and the presentation positions of the subset of the print data objects using one or more draw rules.

9. A method, comprising:

storing a first print job comprising print data objects, and print job commands that define the print data objects for the first print job;

processing the print job commands to identify the print data objects;

selecting a subset of the print data objects for processing;

encrypting the subset of the print data objects using a key while the print data objects not selected for processing and the print job commands remain unencrypted;

identifying outlines and presentation positions specified for the subset of the print data objects, by analyzing Page Description Language (PDL) contents of the first print job that define the subset of the print data objects;

generating one or more auxiliary print data objects that graphically represent the outlines and the presentation positions of the subset of the print data objects;

generating a second print job comprising the encrypted print data objects, the auxiliary print data objects, the unencrypted print data objects, and unencrypted print job commands; and providing the second print job.

10. The method of claim 9, wherein:

the method further comprises:

identifying attributes of the subset of the print data objects; and generating the auxiliary print data objects further comprises:

generating the auxiliary print data objects to represent the attributes as presentation text.

11. The method of claim 10, wherein the attributes comprise at least one of:

a type of the print data objects;

a resource identifier of the print data objects;

a format of the print data objects;

human readable information represented by the print data objects; and a color space of the print data objects.

12. The method of claim 9, wherein selecting the subset further comprises:

identifying different types of the print data objects for the first print job; and selecting at least one of the different types of the print data objects as the subset of the print data objects selected for processing.

13. The method of claim 9, further comprising:

adding encrypted object information to an encryption ticket that identifies the encrypted print data objects in the second print job; and providing the encryption ticket comprising the encrypted object information.

14. The method of claim 13, wherein:

the key comprises a symmetric key, the method further comprises:

identifying a public key;

encrypting the symmetric key using the public key to generate an encrypted symmetric key;

adding the encrypted symmetric key to the encryption ticket; and providing the encryption ticket comprising the encrypted object information and the encrypted symmetric key.

15. The method of claim 9, wherein:

the second print job comprises an Intelligent Printer Data Stream (IPDS) print job, the auxiliary print data objects comprise at least one of text objects and text-major text, the text objects graphically represent the outlines and the presentation positions of the subset of the print data objects using background colors, and the text-major text graphically represent the outlines and the presentation positions of the subset of the print data objects using one or more draw rules.

16. A non-transitory computer-readable medium embodying programmed instructions, which, when executed by at least one processor of a print controller, directs the at least one processor to:

store a first print job comprising print data objects, and print job commands that define the print data objects for the first print job;

process the print job commands to identify the print data objects for the first print job;

select a subset of the print data objects for processing;

encrypt the subset of the print data objects using a key while the print data objects not selected for processing and the print job commands remain unencrypted;

identify outlines and presentation positions specified for the subset of the print data objects, by analyzing Page Description Language (PDL) contents of the first print job that define the subset of the print data objects;

generate one or more auxiliary print data objects that graphically represent the outlines and the presentation positions of the subset of the print data objects;

generate a second print job comprising the encrypted print data objects, the auxiliary print data objects, the unencrypted print data objects, and unencrypted print job commands; and provide the second print job.

17. The non-transitory computer-readable medium of claim 16, wherein the programmed instructions further direct the at least one processor to:

identify attributes of the subset of the print data objects; and generate the auxiliary print data objects to represent the attributes as presentation text.

18. The non-transitory computer-readable medium of claim 16, wherein the programmed instructions further direct the at least one processor to:

identify different types of the print data objects for the first print job; and select at least one of the different types of the print data objects as the subset of the print data objects selected for processing.

19. The non-transitory computer-readable medium of claim 16, wherein the programmed instructions further direct the at least one processor to:

add encrypted object information to an encryption ticket that identifies the encrypted print data objects in the second print job; and provide the encryption ticket comprising the encrypted object information.

20. The non-transitory computer-readable medium of claim 19, wherein:

the key comprises a symmetric key, and the programmed instructions further direct the at least one processor to:

identify a public key;
encrypt the symmetric key using the public key to generate an encrypted symmetric key;
add the encrypted symmetric key to the encryption ticket; and
provide the encryption ticket comprising the encrypted object information and the encrypted symmetric key.

* * * * *